(12) United States Patent
Stählin

(10) Patent No.: US 11,067,699 B2
(45) Date of Patent: Jul. 20, 2021

(54) APPARATUS AND METHOD FOR IMPROVED POSITION DETERMINATION FOR A VEHICLE

(71) Applicant: Continental Teves AG & Co. oHG, Frankfurt am Main (DE)

(72) Inventor: Ulrich Stählin, Rochester, MI (US)

(73) Assignee: Continental Teves AG & Co. oHG

( * ) Notice: Subject to any disclaimer, the term of this patent is extended or adjusted under 35 U.S.C. 154(b) by 190 days.

(21) Appl. No.: 16/463,499

(22) PCT Filed: Dec. 19, 2017

(86) PCT No.: PCT/DE2017/200138
§ 371 (c)(1),
(2) Date: May 23, 2019

(87) PCT Pub. No.: WO2018/113858
PCT Pub. Date: Jun. 28, 2018

(65) Prior Publication Data
US 2019/0369261 A1 Dec. 5, 2019

(30) Foreign Application Priority Data
Dec. 22, 2016 (DE) ............ 10 2016 226 052.9

(51) Int. Cl.
*G01S 19/40* (2010.01)
*G01S 19/07* (2010.01)

(52) U.S. Cl.
CPC ............ *G01S 19/072* (2019.08); *G01S 19/40* (2013.01)

(58) Field of Classification Search
CPC ........ G01S 19/072; G01S 19/40; G01S 19/42; G01S 19/09; G01S 19/48; G01S 19/05
(Continued)

(56) References Cited

U.S. PATENT DOCUMENTS

| 6,040,798 A | 3/2000 | Kinal et al. |
| 7,987,047 B2 | 7/2011 | Ishigami et al. |

(Continued)

FOREIGN PATENT DOCUMENTS

| DE | 19643675 A1 | 4/1997 |
| DE | 102007036497 A1 | 2/2009 |

(Continued)

OTHER PUBLICATIONS

German Search Report for German Application No. 10 2016 226 052.9, with partial translation, dated Dec. 7, 2017—11 pages.

(Continued)

*Primary Examiner* — Harry K Liu
(74) *Attorney, Agent, or Firm* — RatnerPrestia

(57) ABSTRACT

An apparatus for use in a vehicle for receiving and processing first data while the vehicle is in a parked position, the data taking into consideration errors in a position determination for the vehicle on account of atmospheric effects. The first data are produced by at least one satellite which is designed to send the first data to the vehicle having a first communication interface. The first communication interface is designed to receive the first data from the at least one satellite. A controller is connectable to the first communication interface in order to receive first data from the first communication interface for processing. The controller is further designed to take the received first data as a basis for determining at least one parameter for the creation of an error correction model for correcting a position error in the determination of a position for the vehicle.

17 Claims, 2 Drawing Sheets

(58) Field of Classification Search
USPC .................................................. 342/357.23
See application file for complete search history.

(56) References Cited

U.S. PATENT DOCUMENTS

| | | | |
|---|---|---|---|
| 8,378,854 B1* | 2/2013 | Siris ..................... | G01S 19/072 |
| | | | 340/989 |
| 9,134,426 B1* | 9/2015 | Siris ....................... | G01S 19/52 |
| 2005/0083230 A1 | 4/2005 | Harvey et al. | |
| 2009/0037105 A1 | 2/2009 | Krueger et al. | |
| 2011/0080302 A1* | 4/2011 | Muthaiah ............ | H04W 12/069 |
| | | | 340/903 |
| 2011/0123371 A1* | 5/2011 | Yasuzaka .............. | F04C 27/003 |
| | | | 417/410.1 |
| 2017/0363744 A1* | 12/2017 | Miya ..................... | G01S 19/072 |
| 2018/0203455 A1* | 7/2018 | Cronin ............... | G01C 21/3492 |

FOREIGN PATENT DOCUMENTS

| | | |
|---|---|---|
| DE | 112008002434 B4 | 7/2013 |
| DE | 102013001120 A1 | 7/2014 |
| JP | 2001124841 A | 5/2001 |
| JP | 2017181167 A * | 10/2017 |

OTHER PUBLICATIONS

International Search Report and Written Opinion for International Application No. PCT/DE2017/200138, dated Apr. 30, 2018—9 pages.
Jakowski et al., "Ionospheric Range Error Correction Models", 2012 International Conference on Localization and GNSS, Starnsberg, 2012—22 pages.

* cited by examiner

APPARATUS AND METHOD FOR IMPROVED POSITION DETERMINATION FOR A VEHICLE

CROSS REFERENCE TO RELATED APPLICATIONS

This application is the U.S. National Phase Application of PCT International Application No. PCT/DE2017/200138, filed Dec. 19, 2017, which claims priority to German Patent Application No. 10 2016 226 052.9, filed Dec. 22, 2016, the contents of such applications being incorporated by reference herein.

FIELD OF THE INVENTION

The present invention relates to an apparatus and a method for improved position determination for a vehicle.

BACKGROUND OF THE INVENTION

Modern vehicles are frequently equipped with what are known as vehicle position determination apparatuses, such as for example navigation systems, in order to provide the driver with a present position of his vehicle so that it is easier for the driver to cope in surroundings that are unknown to him. Navigation systems of this kind are sufficiently well known from the prior art. The fundamental principle of such systems is based on processing signals, such as for example a GPS signal sent from a satellite to a vehicle, such that a vehicle position can be determined that is preferably continuously updated. This requires communication between the satellite and the navigation system. For the purpose of determining a vehicle position, such a navigation system comprises what is known as a GNSS (Global Navigation Satellite System) reception module.

The quality of such navigation systems for a vehicle is in this case primarily dependent on the accuracy of the determined vehicle position. A significant factor influencing the accuracy of a determined vehicle position is the state or composition of the atmosphere between the satellite and the vehicle, since this substantially influences the propagation times of the signals between the satellite and the vehicle. Influencing of the signal propagation times affects the measured distance of the vehicle from the satellite, this in turn being needed for position determination for the vehicle. The influence of the atmosphere as a result of what are known as atmospheric effects thus contributes substantially to the accuracy with which a vehicle position can be determined or, put another way, the error with which the vehicle position to be ascertained is output.

In order to compensate for the influence of these atmospheric effects on the position determination for a vehicle by a navigation system, it is currently usual for the position determination for a vehicle by a navigation appliance to involve the use of additional data that compensate for or at least reduce the influence of these atmospheric effects and hence the error on account of these effects. These additional data are based predominantly on a mathematically ascertainable error correction model in order to be able to assess and hence take into consideration the influence of these atmospheric effects in advance. The accuracy of a vehicle position to be determined is substantially dependent in this case on the quality of these additional data and of the error correction model used. A disadvantage limiting the use of these additional data is the fact that such data are often provided only by commercial providers, which means that a particular degree of accuracy in a position statement is obtained only by purchasing these fee-based data.

SUMMARY OF THE INVENTION

Aspects of the present invention are an apparatus and a method that improves the accuracy for position determination for a vehicle by taking into consideration atmospheric effects and at low cost.

According to an aspect of the invention, this object is achieved by the features of the independent patent claims. The dependent claims, the description and the figures relate to advantageous embodiments of the present invention.

According to a first aspect, the invention relates to an apparatus for use in a vehicle for receiving and processing first data while the vehicle is in a parked position, said data taking into consideration errors in a position determination for the vehicle on account of atmospheric effects, and wherein the first data are produced by at least one satellite, wherein the at least one satellite is designed to send the first data to the vehicle, having a first communication interface, wherein the first communication interface is designed to receive the first data from the at least one satellite, a controller, which is designed to be connectable to the first communication interface in order to receive first data from the first communication interface for processing, and wherein the controller is further designed to take the received first data as a basis for determining at least one parameter for the creation of an error correction model for correcting a position error in the determination of a position for the vehicle.

The vehicle may be a motor vehicle, in particular a passenger motor vehicle, a truck, a motorcycle, an electric motor vehicle or a hybrid motor vehicle.

The first data are preferably measurement data produced by a satellite.

The fundamental concept behind an aspect of the present invention is that the atmospheric effects change only very slowly. For the period or the period of time during which the vehicle is in a parked position, the apparatus according to an aspect of the invention receives the first data provided and produced by the satellite in defined and preferably regular time intervals.

These first data, which contain information about a propagation time of a signal from the at least one satellite to the vehicle, can be used by the controller to determine the respective distance of the vehicle from the at least one satellite. The measurement of the first data by the apparatus according to an aspect of the invention, which contains the controller, is effected in this case in particular periods of time that are coordinated with one another such that errors in the signal propagation time determination for the signals between satellites and vehicle on account of atmospheric effects can finally be detected. In particular because the vehicle is in a parked position and its position thus does not change for a relatively long period, disparities in the signal propagation time measurements when recording a multiplicity of first data, which are reflected in the first data, can be detected by the controller and interpreted accordingly.

These first data are then used as a basis for the controller in order to create at least one parameter for the creation of an error correction model that is continually optimised and improved. This error correction model, or the parameters thereof for the creation of such an error correction model, can then be used by a navigation system or a localisation system for optimised ascertainment of a vehicle position. The more accurate the design of this error correction model, the more accurately the vehicle position to be determined—preferably by a navigation system or a localisation system—will turn out, that is to say that it will be afflicted by a smaller (position) error, which is also primarily dependent on the atmospheric effects cited at the outset. The consideration of these first data for the creation of at least one parameter for an error correction model for correcting a position error in the determination of a position for a vehicle means that no commercial correction services are required, the data of which have to date been used to take into consideration such position errors in the determination of a vehicle position. The resultant advantage is a higher level of accuracy for the vehicle position that is to be determined when it is provided using the error correction model. The vehicle position itself is generated by a navigation system or a localisation system, for example.

A further advantage of an aspect of the present invention is that these first data produced by the satellite can be used to continually optimise an error correction model that can be used to perform more accurate position determination for the vehicle, for example by means of an applicable navigation system or a localisation system. Preferably, the first data are recorded in a period of time in which the relevant vehicle is in a parked position. Similarly, the error correction model is preferably created while the vehicle is in the parked position. When the vehicle has left its parked position and is moving away, the already created error correction model can then be used in driving mode to produce a vehicle position, generated in real time, with a high degree of accuracy. In this context, a high degree of accuracy means that errors in the position determination are corrected, precisely on the basis of the error correction model used, which is used as a basis for the position determination.

According to one implement of an aspect of the present invention, the error correction model is in the form of an atmosphere model. This achieves the advantage that the correction of the position error in the determination of a vehicle position is based on atmosphere-relevant data, which substantially influence the position error;

According to one embodiment of an aspect of the present invention, the controller and/or the first communication interface is designed to be switchable from a standby mode to an operating mode before the first data are received and processed, and the controller and/or the first communication interface is furthermore designed to be switchable from the operating mode to the standby mode after the first data have been received and processed. This achieves the advantage that the controller and/or the first communication interface is/are operated in energy-efficient fashion and energy for the operation thereof is needed only when they are in the operating mode in order to receive and process data.

According to one embodiment of an aspect of the present invention, the apparatus comprises a time-controlled apparatus that is designed to switch the controller and/or the first communication interface from the standby mode to the operating mode in defined time intervals in order to receive and process first data. The time-controlled apparatus can preferably be in the form of a clock generator apparatus in this case. The switching of the controller and/or of the first communication interface by the time-controlled apparatus allows the receiving and processing of first data in defined time intervals to be ensured. Since a large number of received first data from the satellite is advantageous for the creation of at least one parameter for the creation of the error correction model for correcting a position error in the determination of a position for the vehicle, it is advantageous if the controller and/or the first communication interface is/are switched from the standby mode to the operating mode in regular time intervals so that said operating mode can receive and process first data. The length of these regular intervals of time is accordingly adjustable. The regular switching of the controller and/or of the first communication interface from the standby mode to the operating mode is preferably effected in a period in which the vehicle is in a parked position. After first data are received and processed, the controller and/or the first communication interface is reset to the standby mode again by the time-controlled apparatus. The first communication interface may also be an integral part of the controller in this case.

According to one embodiment of the present invention, the apparatus according to an aspect of the invention comprises a second communication interface via which the controller is connectable to a sensor apparatus in order to receive second data, wherein the second data are produced by the sensor apparatus. This achieves the advantage that the accuracy of the error correction model can be increased further, since the second data can provide additional information that can contribute to improved correction or to minimisation of the position error in the determination of a vehicle position. The sensor apparatus is designed to send the second data to the controller in this case.

According to one embodiment of an aspect of the present invention, the sensor apparatus comprises a temperature sensor and/or a humidity sensor and/or an air pressure sensor. This achieves the advantage that additional adverse effects based on further or other environmental influences and adversely influencing the signal propagation times between the at least one satellite and the vehicle by means of disadvantageous noise can be explicitly selected from what are known as the atmospheric effects and preferably eliminated.

According to one embodiment of an aspect of the present invention, the controller is connectable to a battery apparatus. This achieves the advantage that the controller can be supplied with power, and hence operated, independently of other energy sources present in the vehicle.

According to one embodiment of the present invention, the battery apparatus comprises a storage battery and/or a capacitor and/or a vehicle battery. The use of a storage battery allows the controller or the apparatus according to an aspect of the invention to be supplied with energy without having to access other energy resources in the vehicle that also provide energy for other vehicle components and that are responsible for maintaining information services and other services for vehicle operation. Additionally, the use of a storage battery allows the size thereof to be individually matched to the requirements for the energy needs of the apparatus according to an aspect of the invention and the components thereof, such as for example the controller and/or the first communication interface.

According to one embodiment of the present invention, the apparatus according to an aspect of the invention comprises a memory apparatus, wherein the memory apparatus is designed to be connectable to the controller. This achieves the advantage that first data received by the controller can be stored for possible processing at a later time. The controller thus does not then need to be designed to receive and process first data at the same time, since applicable processing of the received data can also be effected at a later time when the reception phase is complete. A further advantage is that processed data can be stored in the memory apparatus by the controller, said memory apparatus then being able to be accessed by other vehicle components, for example a navigation system or a localisation system that wishes to use the first data or the first data processed by the controller, for example in the form of parameters, for the creation of an error correction model for correcting a position error in the position determination for the vehicle. This can be effected at a time at which the vehicle is in a parked position, but also while the vehicle is moving away, in order to achieve optimised position determination using the error correction model created during the parked time while the vehicle is moving away. The memory apparatus may be an integral part of the controller or else arranged outside the controller in this case. The memory apparatus can record first data, processed first data, but also other data, such as for example second data provided by a sensor apparatus, and store them as required.

According to one embodiment of the present invention, the memory apparatus comprises a RAM module and/or a flash memory and/or an EEPROM. This achieves the advantage that, depending on the memory type used, the data to be stored in the memory apparatus can be handled differently, that is to say for example can be read or written at a higher data rate. A further advantage is that flexible handling of the respective memory apparatus used is achieved, that is to say that for example faster interchange of the memory apparatus in the event of maintenance or expansion of the memory capacity becomes possible, depending on the technical requirement when a particular memory type is used.

According to one embodiment of the present invention, the first communication interface and/or the second communication interface is in the form of an integral part of the controller. This achieves the advantage that the apparatus can be in the form of a compact device, and in this manner valuable installation space in the vehicle can be made available for other vehicle-relevant components.

According to one embodiment of the present invention, the controller is further designed to improve the created error correction model while the vehicle is moving, that is to say after the vehicle has left its parked position, in order to achieve optimised position determination for the vehicle, in particular also while the vehicle is moving. This achieves the advantage that a position of the vehicle that has been ascertained in real time, in particular while the vehicle is moving away, can resort to the error correction model created during the parked time of the vehicle and therefore has a higher level of accuracy and can also be provided more quickly.

According to a second aspect, the invention relates to a method for use in a vehicle for receiving and processing first data while the vehicle is in a parked position, said data taking into consideration errors in a position determination for the vehicle on account of atmospheric effects, and wherein the first data are produced by at least one satellite, wherein the at least one satellite is designed to send the first data to the vehicle, comprising the steps of: receiving the first data by means of the first communication interface and transmitting the first data from the first communication interface to a controller for processing the first data, and determining at least one parameter for the creation of an error correction model for correcting a position error in the determination of a position for the vehicle on the basis of the received first data by means of the controller. The method according to an aspect of the invention can be performed using the apparatus.

The method according to an aspect of the invention achieves the advantage that the correction of a position error in the determination of a position for the vehicle using the created error correction model leads to a higher level of accuracy for the vehicle position that is to be determined. Additionally, this accuracy of the vehicle position that is to be determined can then also be maintained while the vehicle is moving away, because the error correction model already created while the vehicle is in the parked position can also be resorted to while the vehicle is moving away, of course, for example by a navigation system or a localisation system that determines the vehicle position in real time. A further advantage is additionally that the vehicle position to be ascertained can be ascertained very quickly if the error correction model to which the navigation system or the localisation system resorts is already available.

According to a third aspect, the present invention relates to a vehicle having an apparatus for receiving and processing first data. In this case, the error correction model created while the vehicle is in a parked position is usable for a navigation system or localisation system, arranged in the vehicle, while the vehicle is moving, in order to obtain optimised position determination for the vehicle while the vehicle is moving. This achieves the advantage that optimised position determination for the vehicle can be provided while it is moving away, in order to provide the vehicle user with a higher level of accuracy for the ascertained vehicle position while he is driving.

BRIEF DESCRIPTION OF THE DRAWINGS

Further exemplary embodiments are explained in more detail with reference to the accompanying figures, in which.

DETAILED DESCRIPTION OF THE PREFERRED EMBODIMENTS

In the detailed description that follows, reference is made to the accompanying drawings, which form a part thereof and which show, as an illustration, specific embodiments in which aspects of the invention can be carried out. It goes without saying that other embodiments can also be used and structural or logical changes can be made without departing from the concept of an aspect of the present invention. The detailed description that follows should therefore not be understood in a restrictive sense. It also goes without saying that the features of the various exemplary embodiments described herein can be combined with one another unless specifically stated otherwise.

Figure 1:
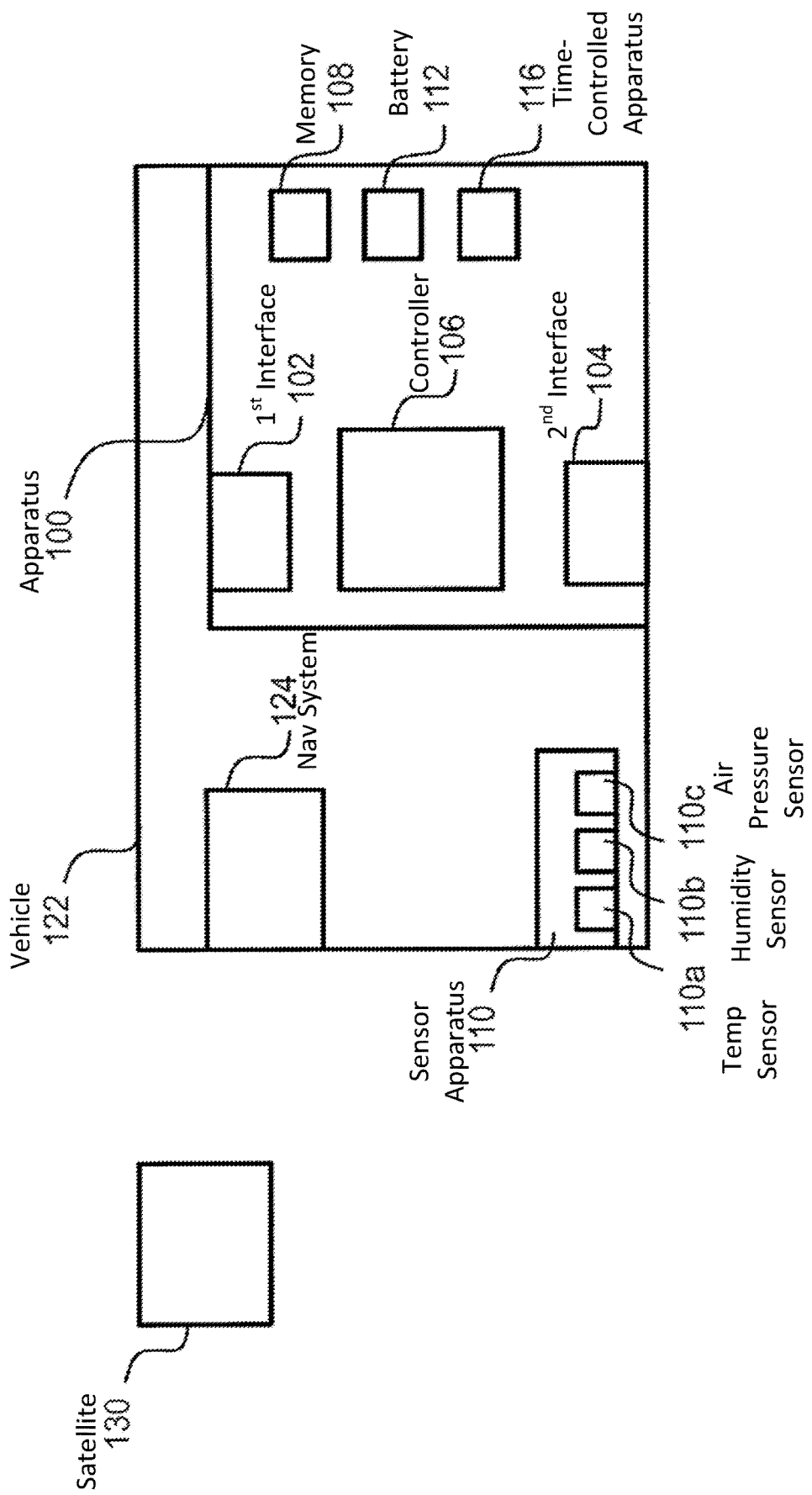
FIG. 1 shows a schematic illustration of an apparatus for use in a vehicle according to an embodiment of the present invention.

FIG. 1 shows a schematic illustration of an apparatus 100 for use in a vehicle 122.

The vehicle 122, as depicted in FIG. 1, comprises a navigation system 124 having a GNSS (Global Navigation Satellite System) reception apparatus in order to determine or calculate a position of the vehicle 122. The navigation system 124 can be a navigation system installable in the vehicle 122. In the text below, the navigation system 124 is representative of all systems in the vehicle that determine a position of the vehicle, that is to say for example including a localisation system or a system for an automatic emergency call (eCall).

According to FIG. 1, the apparatus 100 according to an aspect of the invention is intended for use in a vehicle 122 for receiving and processing first data that take into consideration errors in a position determination for the vehicle 122. The first data are produced by at least one satellite 130, wherein the at least one satellite 130 is designed to send the first data to the vehicle 122. Although only one satellite is depicted in FIG. 1 for reasons of simplicity, there are ideally up to 4 or more satellites in use that each transmit data and signals to the relevant vehicle in order to be able to make an assessable statement therefrom about possible errors in propagation times of signals interchanged between the individual satellites and the vehicle. The first data in this case take into consideration an atmospheric state between the satellite 130 and the vehicle 122 has an influence on a position error in a determination for a position of the vehicle 122. As already mentioned at the outset, these so-called measurements of these first data by the apparatus 100 are the basis for a determination of individual signal propagation times that different signals need from the satellite to the vehicle. Possible errors in these signal propagation times of the individual signals can then be spotted on the basis of the unaltered position of the vehicle at the time of the individual measurements and the interval of time between the individual measurements performed, and can finally be removed, as explained in even more detail below.

The apparatus 100 comprises a first communication interface 102 for communication with the satellite 130. Within the context of an aspect of this invention, communication by the first communication interface 102 with the satellite 130 is preferably intended to be understood to mean receiving the first data from the satellite 130. Part of the function of the first communication interface 102 can thus be regarded, in principle, as a type of antenna including a receiver (transceiver) that receives the first data of the satellite 130. The communication between the satellite 130 and the vehicle 122 via the first communication interface 102 is preferably effected while the vehicle 122 has adopted a parked position, that is to say that the position of the vehicle preferably does not change while the apparatus 100 receives the first data from the satellite 130. One reason is that the atmospheric effects change only very slowly.

The apparatus 100 comprises a first communication interface 102 designed to receive the first data from the at least one satellite 130. In this respect, the first communication interface 102 behaves similarly to a radio antenna with a radio receiver (transceiver) that merely receives data from one or more satellites 130. The communication interface 102 may also be a complete GNSS receiver, including the necessary data processing for determining the raw satellite data, such as for example pseudo-ranges, delta ranges, carrier phases, etc. The communication interface 102 may also be a GNSS reception apparatus.

The apparatus 100 furthermore comprises a controller 106, which is designed to be connectable to the first communication interface 102 in order to receive first data from the first communication interface 102 for processing. The first communication interface 102 may in this case preferably be an integral part of the controller 106 or else may also be separate therefrom.

The first data that the controller 106 has received can then be stored for example by the latter in a memory apparatus 108, as depicted in FIG. 1. The memory apparatus 108, which may be in the form of a RAM module, a flash memory or an EEPROM or another type of memory, may in this case be an integral part of the controller 106. The memory apparatus 108 may be arranged inside the apparatus 100, but outside the controller 106, which can sometimes also permit other technical components, which are part of the apparatus 100 or are connectable thereto, access for storing data.

The controller 106 may be in the form of a separate controller 106, the primary task of which is the reception and processing of the first data, which does not exclude additional tasks, however. As a result, the structure and energy consumption of the controller 106 can be dimensioned according to its respective task.

The controller 106 is designed to take the received first data as a basis for determining at least one parameter for the creation of an error correction model for correcting a position error in the determination of a position for the vehicle 122. The error correction model using the previously created parameters can in this case preferably be created by the navigation system 124 if the navigation system 124 determines a position of the vehicle 122. However, it would also be possible for the controller 106 to provide assistance in the creation of this error correction model or to create it entirely itself if there are appropriate computation capacities of the controller 106 available. The use of an applicable error correction model allows errors in the position determination on account of atmospheric effects to be eliminated. This achieves a higher degree of accuracy for the position determination of the vehicle 122.

The controller 106 may further be designed to improve the created error correction model while the vehicle 122 is moving, that is to say after the vehicle 122 has left its parked position, in order to achieve optimised position determination for the vehicle 122, in particular also while the vehicle 122 is moving.

The error correction model preferably created while the vehicle 122 is in a parked position can also be used while the vehicle 122 is moving, for example by a navigation system 124, in order to ascertain an optimised position of the moving vehicle 122 in real time.

In order to be economical with the available energy resources, the controller 106 is further designed to be switchable from a standby mode to an operating mode. This is preferably always effected before the controller 106 receives and processes first data. Once sufficient first data have been received and said data have also been processed if need be, the controller 106 can then be switched back from the operating mode to the energy-saving standby mode again, in which the controller 106 and the apparatus 100 consume little to no energy. As a result of the controller 106 being switchable between these two modes, the controller 106 and hence also the apparatus 100 can be operated in resource-saving fashion. The same applies to the first communication interface 102, which can likewise be of appropriate design to be switched between these two modes. In particular if said first communication interface is arranged separately from the controller 106.

The switching of the controller 106 and/or the first communication interface 102 between the two modes, standby mode and the operating mode for receiving and processing first data, or, more generally, data, which are also transmitted from other technical components of the apparatus 100 or of the vehicle 122 to the controller 106 if need be, can preferably be effected by a time-controlled apparatus 116, which may be in the form of a clock generator, for example. This time-controlled apparatus 116 can switch the controller 106 from the standby mode to the operating mode—the controller 106 thus wakes up—in defined and optionally also individually adjustable time intervals so that it can receive and process first data. The same applies when the controller 106 and/or the first communication interface 102 is returned from the operating mode to the standby mode by the time-controlled apparatus 116. In this case, apparatus 116 may be part of the controller 106 or a separate element of apparatus 100.

Since it is important for the creation of at least one parameter for the creation of an error correction model for correcting a position error and hence also for the degree of accuracy of a position determination for the vehicle 122 to receive a large set of first data, it makes sense if the controller 106 receives and processes first data at regular intervals of time. This requires the controller 106 to be regularly transferred from the standby mode to the operating mode. This can just be effected by the time-controlled apparatus 116. Optionally, however, the controller 106 can also transfer itself to such a state if it has an internal clock generator. The time-controlled apparatus 116 may be part of the controller 106 in this specific case.

The controller 106 and/or the first communication interface 102 can contain appropriate test routines in order to check whether first data can be received from the satellite 130. Such a check is preferably effected shortly before or while the vehicle 122 is transported to a parked position. If the controller 106 of the apparatus 100 establishes that no first data can be received from the satellite 130, for example because signal reception is poor owing to the vehicle 122 being in a parked position in a garage, then no further attempts are made by the controller 106 to perform new measurements, that is to say to obtain first data. The controller 106 is then transferred to the standby mode in order to save energy. However, if the apparatus 100 notices that for example the parked position of the vehicle 122 has changed and better signal reception is possible, then the controller 106 can sometimes be transferred from the standby mode to the operating mode again, in order to be able to receive first data via the first communication interface 102.

As shown in FIG. 1, the apparatus 100 comprises a battery apparatus 112 that is designed to be connectable to the controller 106 in order to supply the controller 106 with energy. The battery apparatus 112 may be a storage battery, a capacitor or, in special cases, also a vehicle battery of the vehicle 122 (not depicted in FIG. 1) or any combination of different energy stores. The battery apparatus 112 does not have to be necessarily and completely inside the apparatus 100, but rather may be in a distributed arrangement in the vehicle 122 if this allows an efficient battery management system to be installed in the vehicle 122 that supplies totally different vehicle components with energy. The size of the battery apparatus 112 is dependent on various factors. One factor influencing the dimensioning of the battery apparatus 112 may be how many times over a defined period the controller 106 is woken up, that is to say how often the controller 106 is transferred from a standby mode to an operating mode. Another influencing variable may be the period that the controller 106 needs for receiving and processing first data. Additionally, an important aspect for the dimensioning of the battery apparatus 112 is what further technical components apart from the controller 106 need to be supplied with energy.

In a further implementation of the apparatus 100, and as depicted in FIG. 1, the apparatus 100 is connectable to a sensor apparatus 110 via a second communication interface 104, in order to receive second data. The second data are preferably produced by the sensor apparatus 110 and can be transmitted from the latter to the controller 106 for further processing. These second data can for example likewise be stored in the memory apparatus 108 for use at a later time.

The second data in this case may be values that have been recorded by a number of different sensors. In FIG. 1, the sensor apparatus 110 arranged in the vehicle 122 comprises a temperature sensor 110a, a humidity sensor 110b and an air pressure sensor 110c. The measured values of these sensors, the number and type of which are not restricted to those specified here, are transmitted to the controller 106 via the sensor apparatus 110 and in this manner provide additional information for the controller 106. The second data, which are thus collected via the existing sensors, contribute to identifying further noise sources influencing the propagation times of the signals between the satellite 130 and the vehicle 122 so that these "noise sources" can be taken as a basis for determining and ultimately removing a position error arising in the position determination for the vehicle 122. The individual sensors, as depicted in FIG. 1, may be arranged at different positions inside the vehicle 122.

The sensor apparatus 110 can have an appropriate processing apparatus (not depicted in FIG. 1) for processing the sensor values transmitted to it and recorded. Additionally, an additional communication interface, not depicted in FIG. 1, can be used to transmit the individual sensor values from the sensor apparatus 110 to the controller 106. The second data can in this case be produced and transmitted to the controller 106 independently of the first data. On the basis of the first data and the second data, the controller 106 is capable of distinguishing between atmospheric interfering effects and other interfering effects that adversely influence position determination for the vehicle 122. This allows a more precise assessment of the atmospheric effects, which can ultimately contribute to improving the error correction model.

The first data received by the controller 106 can simply be stored in the memory apparatus 108 for further use by other apparatuses, such as for example the navigation system 124. However, the controller 106 may also be designed, as already described, to create at least one parameter for an optimised error correction model from the first data and to store this parameter in the memory apparatus 108 for further use for example by the navigation system 124.

Figure 2:
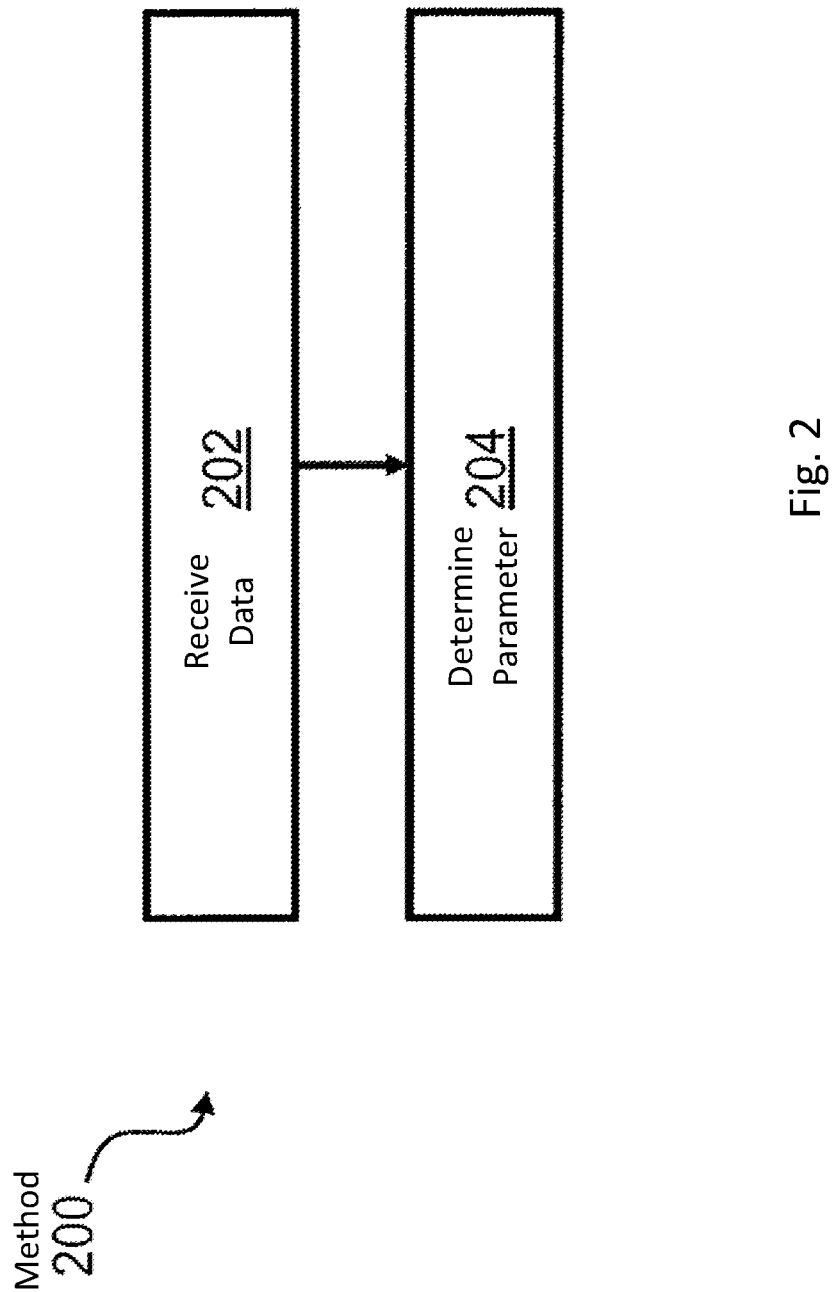
FIG. 2 shows a diagram of a method for an apparatus for use in a vehicle for receiving and processing first data.

FIG. 2 shows a diagram of a method 200 for an apparatus 100 for use in a vehicle 122 for receiving and processing first data while the vehicle 122 is in a parked position, said data taking into consideration errors in a position determination for the vehicle 122 on account of atmospheric effects, wherein the first data are produced by at least one satellite 130, wherein the at least one satellite 130 is designed to send the first data to the vehicle 122. The method 200 comprises a first step 202 of receiving the first data by means of the first communication interface 102 and transmitting the first data from the first communication interface 102 to a controller 106 for processing the first data. The method 200 comprises a second step 204 of determining at least one parameter for the creation of an error correction model for correcting a position error in the determination of a position for the vehicle 122 on the basis of the received first data by means of the controller 106.

The method 200 can be performed using the apparatus 100 according to an aspect of the invention.

LIST OF REFERENCE SIGNS

100 Apparatus
102 First communication interface
106 Controller
108 Memory apparatus
110 Sensor apparatus
110a Temperature sensor
110b Humidity sensor
110c Air pressure sensor
112 Battery apparatus
116 Time-controlled apparatus
122 Vehicle
124 Navigation system 128 Processing apparatus
130 Satellite
200 Method
202 Receive first data
204 Determine at least one parameter

The invention claimed is:

1. An apparatus for use in a vehicle for taking into consideration errors in a position determination for the vehicle, the apparatus comprising:
a first communication interface configured to receive a first data from the at least one satellite; and
a controller configured to:
determine that the vehicle is parked,
in response to determining that the vehicle is parked, process the received first data to determine at least one parameter for the creation of an error correction model for correcting a position error caused by atmospheric effects in the determination of a position for the vehicle calculated from positioning signals received from the at least one satellite.

2. The apparatus as claimed in claim 1, wherein the error correction model is in the form of an atmosphere model.

3. The apparatus as claimed in claim 2, wherein the controller and/or the first communication interface is designed to be switchable from a standby mode to an operating mode before the first data are received and processed, and wherein the controller and/or the first communication interface is furthermore designed to be switchable from the operating mode to the standby mode after the first data have been received and processed.

4. The apparatus as claimed in claim 1, wherein the controller and/or the first communication interface is designed to be switchable from a standby mode to an operating mode before the first data are received and processed, and wherein the controller and/or the first communication interface is furthermore designed to be switchable from the operating mode to the standby mode after the first data have been received and processed.

5. The apparatus as claimed in claim 1, comprising a second communication interface, via which the controller is connectable to a sensor apparatus in order to receive second data, wherein the second data are produced by the sensor apparatus.

6. The apparatus as claimed in claim 5, wherein the sensor apparatus comprises a temperature sensor and/or a humidity sensor and/or an air pressure sensor.

7. The apparatus is claimed in claim 1, wherein the controller is connectable to a battery apparatus.

8. The apparatus as claimed in claim 7, wherein the battery apparatus comprises a storage battery and/or a capacitor and/or a vehicle battery.

9. The apparatus as claimed in claim 1, comprising a memory apparatus that is designed to be connectable to the controller.

10. The apparatus as claimed in claim 9, wherein the memory apparatus comprises a RAM module and/or a flash memory and/or an EEPROM module.

11. The apparatus as claimed in claim 1, wherein the first communication interface and/or the second communication interface is in the form of an integral part of the controller.

12. The apparatus as claimed in claim 1, wherein the controller is further designed to improve the created error correction model while the vehicle is moving in order to achieve optimised position determination for the vehicle.

13. A vehicle having an apparatus for use in a vehicle for receiving and processing first data as claimed in claim 1.

14. The vehicle as claimed in claim 13, wherein the error correction model created while the vehicle is in a parked position is usable for a navigation system, arranged in the vehicle, while the vehicle is moving, in order to obtain optimised position determination for the vehicle while the vehicle is moving.

15. The apparatus as claimed in claim 1, wherein the controller is further designed to improve the created error correction model after the vehicle has left its parked position in order to achieve optimised position determination for the vehicle while the vehicle is moving.

16. An apparatus for use in a vehicle for receiving and processing first data while the vehicle is in a parked position, said data taking into consideration errors in a position determination for the vehicle on account of atmospheric effects, and wherein the first data are produced by at least one satellite, wherein the at least one satellite is designed to send the first data to the vehicle, comprising:
a first communication interface, wherein the first communication interface is designed to receive the first data from the at least one satellite; and
a controller, which is designed to be connectable to the first communication interface in order to receive first data from the first communication interface for processing,
wherein the controller is further designed to take the received first data as a basis for determining at least one parameter for the creation of an error correction model for correcting a position error in the determination of a position for the vehicle, and
wherein the apparatus comprises a time-controlled apparatus that is designed to switch the controller and/or the first communication interface from the standby mode to the operating mode in defined time intervals in order to receive and process first data.

17. A method for use in a vehicle for taking into consideration errors in a position determination for the vehicle, the method comprising:
receiving the first data by the first communication interface configured to receive a first data from at least one satellite;
determine, by a controller, that the vehicle is parked;
in response to determining that the vehicle is parked, process the received first data to determine at least one parameter for the creation of an error correction model for correcting a position error caused by atmospheric effects in the determination of a position for the vehicle calculated from positioning signals received from the at least one satellite.

* * * * *